(12) United States Patent
Sugiyama

(10) Patent No.: US 6,393,059 B1
(45) Date of Patent: May 21, 2002

(54) CONVERSION OF VIDEO DATA BIT STREAM

(75) Inventor: Kenji Sugiyama, Yokosuka (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 09/234,838

(22) Filed: Jan. 22, 1999

(30) Foreign Application Priority Data

Jan. 22, 1998 (JP) ........................................... 10-025039
May 26, 1998 (JP) ........................................... 10-161345

(51) Int. Cl.⁷ ............................................... H04N 7/12
(52) U.S. Cl. ............................ 375/240.02; 375/240.16; 375/240.21
(58) Field of Search ....................... 375/240.02, 240.25, 375/240.26, 240.21, 240.16, 240.17, 240.29; 382/239, 233, 235, 236; 348/416.1, 402.1, 413.1, 425.1, 425.3; 386/111–112; 358/261.2, 428, 430

(56) References Cited

U.S. PATENT DOCUMENTS

| | | | | |
|---|---|---|---|---|
| 5,537,440 A | * | 7/1996 | Eyuboglu et al. | 375/245 |
| 5,600,646 A | * | 2/1997 | Polomski | 370/263 |
| 5,729,293 A | * | 3/1998 | Keesman | 348/401 |
| 5,805,224 A | * | 9/1998 | Keesman et al. | 348/405 |
| 5,870,146 A | * | 2/1999 | Zhu | 348/405 |
| 5,940,130 A | * | 8/1999 | Nilsson et al. | 348/416 |
| 6,058,143 A | * | 5/2000 | Golin | 375/240 |
| 6,141,447 A | * | 10/2000 | Linzer et al. | 382/236 |

FOREIGN PATENT DOCUMENTS

EP 0637893 A1 * 2/1995 ............ H04N/7/26
EP 0696873 A2 * 2/1996 ............ H04N/7/26

OTHER PUBLICATIONS

Wu et al., "An Efficient JPEG to MPEG–1 Transcoding Algorithm", IEEE Trans. on Consumer Electronics, vol. 42, Iss. 3, pp. 447–457, Aug. 1996.*
Shen et al., "Adaptive Motion Vector Resampling for Compressed Video Down–Scaling", IEEE, ICIP, vol. 1, pp. 771–774, 1997.*

(List continued on next page.)

*Primary Examiner*—Vu Le
(74) *Attorney, Agent, or Firm*—Jacobson Holman, PLLC

(57) ABSTRACT

A first bit stream of moving picture that has been encoded by motion-compensated prediction is converted to a second bit stream of moving picture. A bit stream of first motion vector data is separated from the first bit stream. The first motion vector corresponds to a first block size or first accuracy of motion compensation. A portion or all of the first bit stream is decoded by motion-compensated prediction at the first blok size or the first accuracy of motion compensation using the first motion vector data to obtain a decoded picture or a decoded signal at an intermediate processing stage. A bit stream of second motion vector data is formed by motion-compensated prediction using the first motion vector data. The second motion vector data corresponds to a second block size that is different from the first block size or second accuracy of motion compensation that is different from the first accuracy of motion compensation. The decoded picture or the decoded signal is encoded by motion-compensated prediction at the second accuracy of motion compensation using the second motion vector data to obtain a third bit stream. The third bit stream and the bit stream of the second motion vector data are multiplexed to obtain the second bit stream.

8 Claims, 5 Drawing Sheets

OTHER PUBLICATIONS

Assuncao et al., "Optimal Transcoding of Compressed Video", IEEE, ICIP, vol. 1, pp. 739–742, 1997.*

Swann et al., "Transcoding of MPEG–II for Enhanced Resilience to Transmission Errors", IEEE, ICIP, vol. 2, pp. 813–816, 1996.*

Tudor et al., "Real–time Transcoding of MPEG–2 Video Bit Streams", IEEE, International Broadcasting Convention, pp. 296–301, Sep. 1997.*

A Study on Coding Control Scheme for Video Transcoding, 1–6, published for 1993 Moving Picture Symposium (PCSJ93).

* cited by examiner

CONVERSION OF VIDEO DATA BIT STREAM

BACKGROUND OF THE INVENTION

The present invention relates to conversion of bit stream of video data in highly efficient coding. More specifically, this invention relates to conversion between bit streams of video data encoded by interframe predictive coding at different block sizes or at different levels of motion compensation accuracy.

There is a need to convert bit streams of moving pictures coded by efficient coding under MPEG (Moving Picture Experts Group) standard into bit streams of different data rates or to convert bit streams of variable data rates into bit streams of fixed data rates.

In such cases, video data (original picture) is generally completely decoded and encoded again to form video data of a different data rate. A portion of the video data to be converted can be used as it is for conversion when encoding processing is substantially the same between encoding of the original picture and re-encoding in conversion. In detail, motion vector (MV) data for the video data to be converted is used for re-encoding as it is, so that motion vector detection with complicated calculation for the re-encoding can be omitted.

Furthermore, motion-compensated interframe predictive processing is the same between encoding of the original picture and re-encoding in conversion. Degradation of picture quality due to re-encoding depends only on quantization for the re-encoding, thus minimizing the degradation of picture quality.

The above processing is described in the paper "A Study on Coding Control Scheme for Video Transcoding", 1–6, published for 1993 Moving Picture Symposium (PCSJ93).

Conversion of moving picture bit streams is conventionally applicable only to bit streams of the same pixel block size that undergoes motion compensation between encoding of original picture and re-encoding in conversion. The same MV data can be used for encoding of original picture and re-encoding in conversion as described above. However, the same MV data cannot be used for the conversion when the block sizes that undergo motion compensation are different from each other between the encoding of the original picture and the re-encoding in conversion. Conversion at different pixel block sizes for motion compensation requires complete decoding and re-encoding. This causes an increase in the amount of data to be processed and a decrease in the quality of pictures after conversion.

Furthermore, conversion of moving picture bit streams is conventionally applicable to bit streams to be processed by the same encoding processing between encoding of original picture and re-encoding in conversion. In such cases, the same MV data can be used for the encoding of the original picture and the re-encoding. However, the same MV data cannot be used for conversion when the encoding processing or motion compensation accuracy are different from each other between the encoding of the original picture and the re-encoding in conversion. Conversion at different encoding processing requires complete decoding and re-encoding. This also causes an increase in the amount of data to be processed and a decrease in the quality of pictures after conversion.

SUMMARY OF THE INVENTION

A purpose of the present invention is to provide a moving picture bit stream conversion apparatus and a method thereof that realize no increase in the amount of data to be processed and no decrease in the quality of pictures after conversion, even when the block sizes that undergo motion compensation or encoding processing are different from each other between encoding of an original picture and re-encoding in conversion.

The present invention provides an apparatus for converting a first bit stream of moving picture that has been encoded by motion-compensated prediction to a second bit stream of moving picture. The apparatus includes a separator to separate a bit stream of first motion vector data from the first bit stream. The first motion vector data corresponds to a first block size. The apparatus also includes a decoder to decode a portion or all of the first bit stream by motion-compensated prediction at the first block size using the first motion vector data to obtain a decoded picture or a decoded signal at an intermediate processing stage. Also included by the apparatus is a forming unit to form a bit stream of second motion vector data using the first motion vector data. The second motion vector data corresponds to a second block size that is different from the first block size. The apparatus still includes an encoder to encode the decoded picture or the decoded signal by motion-compensated prediction at the second block size using the second motion vector data to obtain a third bit stream, and also a multiplexer to multiplex the third bit stream and the bit stream of the second motion vector data to obtain the second bit stream.

Furthermore, the present invention provides a method of converting a first bit stream of moving picture that has been encoded by motion-compensated prediction to a second bit stream of moving picture. A bit stream of first motion vector data is separated from the first bit stream. The first motion vector data corresponds to a first block size. A portion or all of the first bit stream is decoded by motion-compensated prediction at the first block size using the first motion vector data to obtain a decoded picture or a decoded signal at an intermediate processing stage. A bit stream of second motion vector data is formed using the first motion vector data. The second motion vector data corresponds to a second block size that is different from the first block size. The decoded picture or the decoded signal is encoded by motion-compensated prediction at the second block size using the second motion vector data to obtain a third bit stream. The third bit stream and the bit stream of the second motion vector data are multiplexed to obtain the second bit stream.

Furthermore, the present invention provides an apparatus for converting a first bit stream of moving picture that has been encoded by motion-compensated prediction to a second bit stream of moving picture. The apparatus includes a separator to separate a bit stream of first motion vector data from the first bit stream. The first motion vector corresponds to first accuracy of motion compensation. The apparatus also includes a decoder to decode a portion or all of the first bit stream by motion-compensated prediction at the first accuracy of motion compensation using the first motion vector data to obtain a decoded picture or a decoded signal at an intermediate processing stage. Further included by the apparatus is a forming unit to form a bit stream of second motion vector data by motion-compensated prediction using the first motion vector data. The second motion vector data corresponds to second accuracy of motion compensation that is different from the first accuracy of motion compensation. The apparatus still includes an encoder to encode the decoded picture or the decoded signal by motion-compensated prediction at the second accuracy of motion compensation using the second motion vector data to obtain a third bit stream, and a multiplexer to multiplex the third bit stream and the bit stream of the second motion vector data to obtain the second bit stream.

Furthermore, the present invention provides a method of converting a first bit stream of moving picture that has been encoded by motion-compensated prediction to a second bit stream of moving picture. A bit stream of first motion vector data is separated from the first bit stream. The first motion vector corresponds to first accuracy of motion compensation. A portion or all of the first bit stream is decoded by motion-compensated prediction at the first accuracy of motion compensation using the first motion vector data to obtain a decoded picture or a decoded signal at an intermediate processing stage. A bit stream of second motion vector data is formed by motion-compensated prediction using the first motion vector data. The second motion vector data corresponds to second accuracy of motion compensation that is different from the first accuracy of motion compensation. The decoded picture or the decoded signal is encoded by motion-compensated prediction at the second accuracy of motion compensation using the second motion vector data to obtain a third bit stream. The third bit stream and the bit stream of the second motion vector data are multiplexed to obtain the second bit stream.

DETAILED DESCRIPTION OF PREFERRED EMBODIMENT

A preferred embodiment according to the present invention will be described in detail with reference to the attached drawings.

Figure 1:
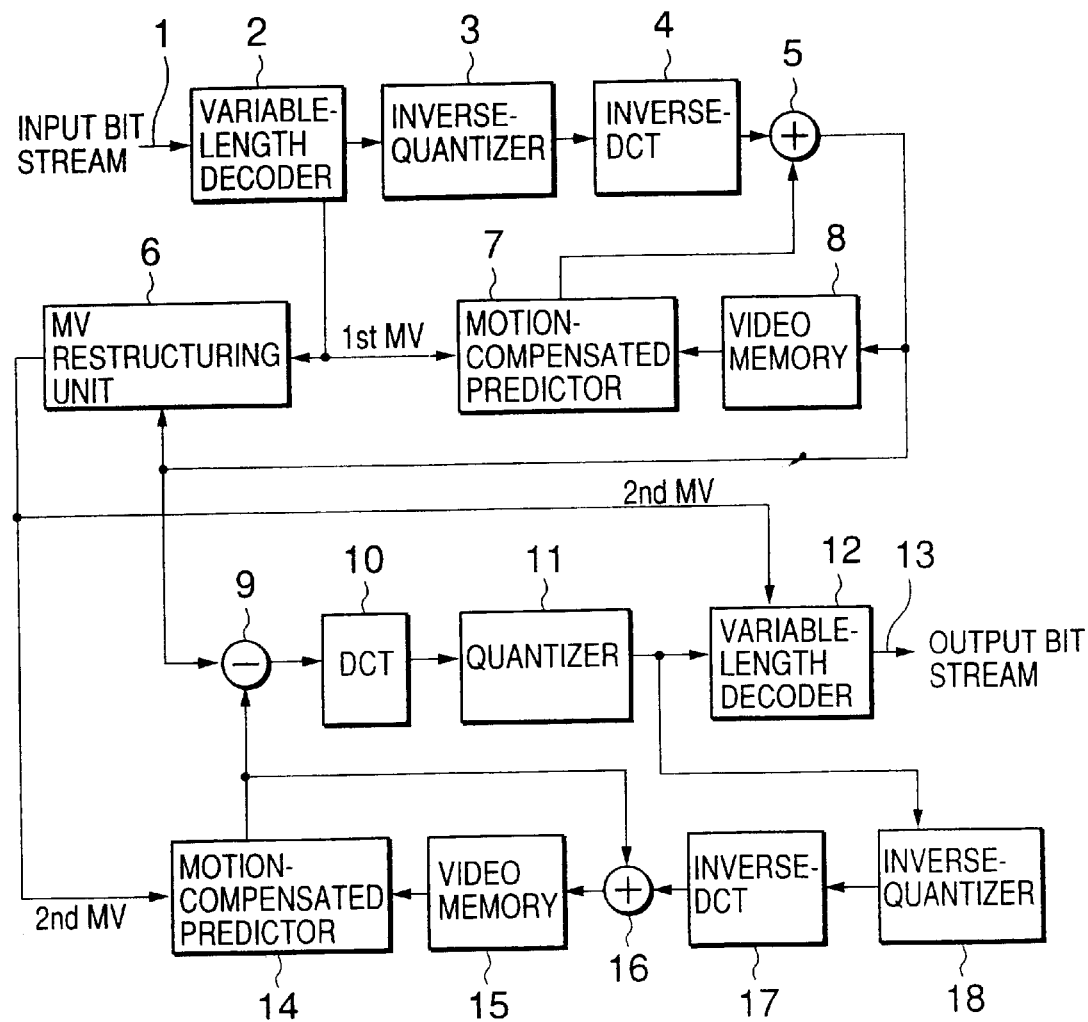
FIG. 1 is a block diagram of a preferred embodiment of a moving picture bit stream conversion apparatus according to the present invention.

Shown in FIG. 1 is a block diagram of a preferred embodiment of a moving picture bit stream conversion apparatus according to the present invention.

A bit stream of moving picture (variable-length code) which has been coded by motion-compensated interframe predictive coding under MPEG standard is input to the apparatus (FIG. 1) through an input terminal 1. The input bit stream includes a bit stream portion of predictive error signal and another bit stream portion of the first MV (Motion Vector) data. These bit stream portions are decoded by a variable-length decoder 2 and converted into fixed-length codes.

The fixed-length code of the predictive error signal is supplied to an inverse-quantizer 3 that reproduces DCT (Discrete Cosine Transform) coefficients per (8×8) block. The DCT coefficients are supplied to an inverse-DCT (Discrete Cosine Transformer) 4 that reproduces the predictive error signal. The predictive error signal is supplied to an adder 5. The adder 5 adds the predictive error signal and a predictive signal supplied from a motion-compensated predictor 7 to reproduce the input moving picture.

The first MV data decoded by the variable-length decoder 2 is supplied to an MV restructuring unit 6 and the motion-compensated predictor 7.

The reproduced moving picture signal is supplied to the MV restructuring unit 6, a video memory 8 and a subtractor 9. The motion-compensated predictor 7 processes the moving picture signal stored in the video memory 8 by motion compensation using the first MV data to generate a predictive signal that is then supplied to the adder 5.

The MV restructuring unit 6 restructures MV data by detecting the second MV data by block matching using the first MV data. The second MV data is used for re-encoding in conversion of the input bit stream into another bit stream of block sizes different from each other or of the same block size but different in accuracy of motion compensation. Restructuring of the second MV data will be described later in detail.

Re-encoding is described in detail. The moving picture signal reproduced by the adder 5 is supplied to the subtractor 9. The subtractor 9 subtracts a predictive signal supplied from a motion-compensated predictor 14 from the reproduced moving picture signal to generate a predictive error signal. The predictive error signal is then supplied to a DCT 10 that transforms the signal into DCT coefficients. The DCT coefficients are supplied to a quantizer 11 that quantizes the coefficients at a predetermined step width to generate fixed-length code of the predictive error signal. The generated fixed-length code is supplied to a variable-length encoder 12 and an inverse-quantizer 18.

The variable-length encoder 12 encodes the fixed-length code of the predictive error signal to a variable-length code. The encoder 12 also encodes the second MV data supplied from the MV restructuring unit 6 to another variable-length code. The variable-length codes are multiplexed and output through an output terminal 13.

The fixed-length code supplied to the inverse-quantizer 18 is processed and supplied to an inverse-DCT 17 that reproduces the predictive error signal. The operations of the inverse-DCT 17 and the inverse-quantizer 18 are inverse of the DCT 10 and the quantizer 11. The reproduced predictive error signal is supplied to an adder 16. The adder 16 adds the predictive error signal and a predictive signal supplied from a motion-compensated predictor 14 to reproduce the moving picture signal.

The reproduced moving picture signal is stored in a video memory 15. The motion-compensated predictor 14 processes the moving picture signal stored in the video memory 15 by motion compensation using the second MV data supplied from the MV restructuring unit 6 to generate a predictive signal. The predictive signal is then supplied to the subtractor 9 and the adder 16.

MV data restructuring from the first MV data to the second MV data is described in detail.

Discussed below is the case where an encoding processing for the input bit stream and that for the output bit stream are the same as each other but the input and output bit streams are of different pixel block sizes for motion compensation. Such block sizes are mostly (16×16) or (8×8) blocks of pixels. The MV data restructuring is divided into two, that is, division of a large block into small blocks and unification of small blocks into a large block.

Figure 2A:
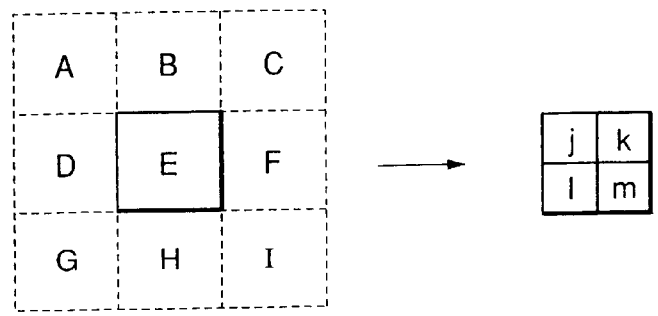
FIG. 2A illustrates MV data restructuring where a (16×16) block of pixels is divided into (8×8) blocks of pixels.

Illustrated in FIG. 2A is the case where a (16×16) block of pixels is divided into (8×8) blocks of pixels. In detail, FIG. 2A shows that four motion vectors (the motion vectors of blocks "j", "k", "l" and "m") of the second MV data are detected based on nine reference motion vectors (the motion vectors of blocks "A", "B", "C", "D", "E", "F", "G", "H" and "I") of the first MV data by detecting motion of a moving picture by block matching in the range of about±two pixels around the reference motion vector of the first MV data.

Motion vectors on the small blocks "j", "k", "l" and "m" are detected by block matching with a motion vector on the large block "E" constituted by the four small blocks, and with motion vectors on other large blocks located in the vicinity of the small blocks. The motion vector on the block "E" and the motion vectors on the other large blocks are used as reference motion vectors.

More specifically, the motion vector on the small block "j" is detected by block matching with the motion vectors on the large blocks "A", "B", "D" and "E" that are used as reference motion vectors. The motion vector on the small block "k" is detected by block matching with the motion vectors on the large blocks "B", "C", "E" and "F" that are used as reference motion vectors. The motion vector on the small block "I" is detected by block matching with the motion vectors on the large blocks "D", "E", "G" and "H" that are used as reference motion vectors. Furthermore, the motion vector on the small block "m" is detected by block matching with the motion vectors on the large blocks "E", "F", "H" and "I" that are used as reference motion vectors. This processing is called Processing I hereinafter.

Instead of Processing I, the motion vector on the large block "E" can be applied to all the four small blocks "j", "k", "l" and "m", thus resulting in a small amount of the second MV data. This processing is called Processing II hereinafter. Processing II is effective when a difference in luminance per pixel due to block matching is less than two percent of the maximum amplitude of a moving picture signal between the Processing I and II.

Figure 2B:
FIG. 2B illustrates MV data restructuring where (8×8) blocks of pixels are united into a (16×16) block of pixels.

Next, illustrated in FIG. 2B is the case where (8×8) blocks of pixels are united into a (16×16) block of pixels. In detail, FIG. 2B shows that one motion vector of the second MV data is detected based on four reference motion vectors of the first MV data.

Figure 3:
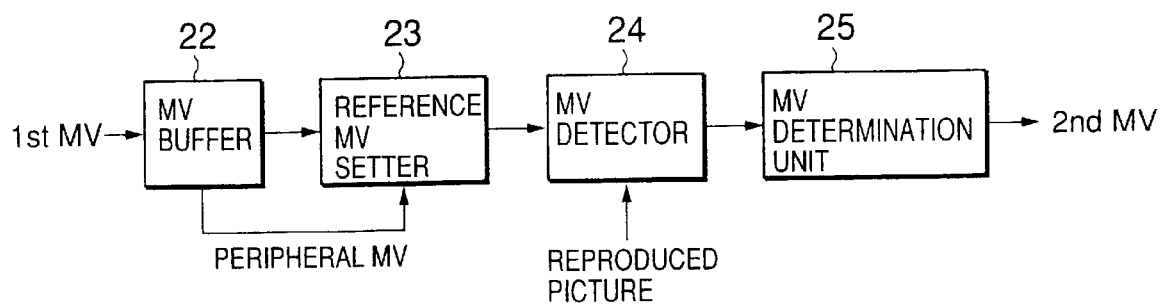
FIG. 3 is a block diagram of the MV restructuring unit shown in FIG. 1.

In detail, the motion vector on a large block "J" is detected by using he motion vectors on small blocks "a", "b", "c" and "d" used as reference motion vectors under detection of motion of a moving picture by block matching on the block "J" around the reference motion vectors. Shown in FIG. 3 is a block diagram of the MV restructuring unit 6 FIG. 1) used for the case where a large block of pixels is divided into small locks of pixels. The operation of the unit 6 will be disclosed with reference to FIGS. 1 and 2A.

The variable-length decoder 2 outputs the first MV data to the MV restructuring unit 6 and the first MV data is stored in an MV buffer 22. The first MV data includes the motion vectors on the large blocks "A" to "I". The motion vector on the center block "E" and also the motion vectors on the peripheral blocks "A", "B", "C", "D", "F", "G", "H" and "I" are supplied to a reference MV setter 23.

The setter 23 sets the reference motion vectors such that the motion vectors on the large blocks "A", "B", "D" and "E"; "B", "C", "E" and "F"; "D", "E", "G" and "H"; and "E", "F", "H" and "I" are set as the reference motion vectors for the small blocks "j"; "k"; "l" and "m", respectively.

The reference motion vectors are supplied to an MV detector 24. Also supplied to the detector 24 is the moving picture reproduced by the adder 5. The detector 24 detects the motion of the reproduced moving picture by block matching in the range of about±two pixels around each reference motion vector. The reproduced moving picture is displaced by each reference motion vector. The block matching is executed between the picture to be coded (reproduced moving picture) and the reference picture (displaced moving picture). The motion vectors are then detected that produce the smallest difference in the total luminance value of pixels between the two moving pictures.

The detected motion vectors are supplied to an MV determination unit 25. The unit 25 examines whether a difference in luminance per pixel is two percent or more of the maximum amplitude of the moving picture signal between the Processing I and II already described. When the difference is two percent or more, the unit 25 determines the detected motion vectors as the second MV data.

Figure 4:
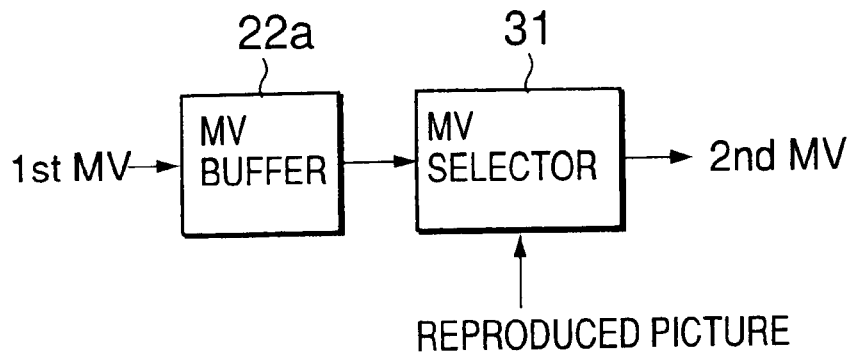
FIG. 4 is a block diagram of a modification of the MV restructuring unit shown in FIG. 1.

Shown in FIG. 4 is a block diagram of the MV restructuring unit 6 (FIG. 1) for the case where small blocks of pixels are unified into a large block of pixels. The operation of the unit 6 (FIG. 4) will be disclosed with reference to FIGS. 1 and 2B.

The variable-length decoder 2 stores four motion vectors (the first MV data) on the small blocks "a" to "d" to an MV buffer 22a. The motion vectors are then supplied to an MV selector 31. Also supplied to the selector 31 is the moving picture reproduced by the adder 5. The selector 31 detects the motion of the reproduced moving picture on the block "J" by block matching. The selector 31 selects the motion vector that produces the smallest difference in the total luminance value of pixels between the picture to be coded (reproduced moving picture) and the reference picture to which the reproduced moving picture has been displaced by each motion vector of the first MV data.

Compared to the processing described with reference to FIGS. 2A and 3, this processing requires a few steps because it is executed only for four motion vectors in the case where (8×8) blocks of pixels are united into a (16×16) block of pixels. as shown in FIG. 2B.

The motion vector restructuring is switched between the two types of processing described above with reference to FIGS. 2A and 3, and FIGS. 2B and 4 per (16×16) block of pixels when either the bit stream input to or output from the apparatus shown in FIG. 1 includes a combination of (16×16) and (8×8) blocks of pixels. On the other hand, when the input and output bit streams include the same block of pixels, the first MV data is used as the second MV data as it is with no restructuring.

Discussed below is the case where bit streams input to and output from the apparatus shown in FIG. 1 are of the same pixel block size but different in accuracy of motion compensation.

Accuracy of motion compensation is mostly one pixel, ½ pixel or ¼ pixel. Among the international video compression standards, for example, accuracy of motion compensation is one pixel for ITU-T H. 261, ½ pixel for MPEG 1 and MPEG 2 and ITU-T H. 262, and ¼ pixel for MPEG 4.

Conversion from one bit stream to another with different levels of motion compensation accuracy is divided into two cases. One is conversion from high to low accuracy and the other is from low to high accuracy of motion compensation. The former case requires MV data restructuring while the latter case does not require such restructuring. However, high coding efficiency will be achieved by MV data restructuring even in the latter case.

Figure 5:
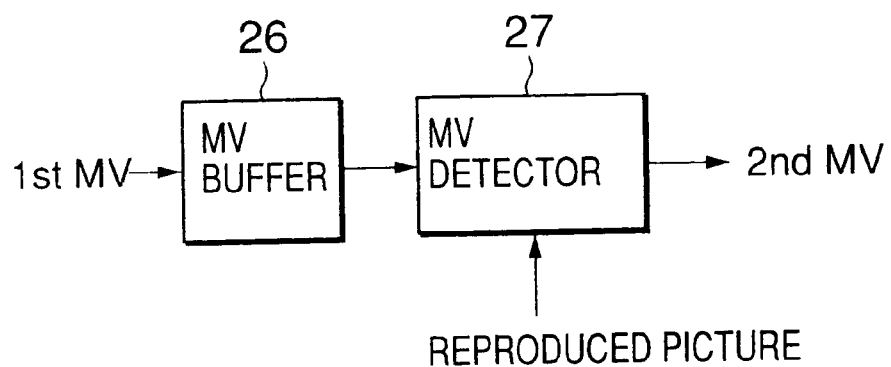
FIG. 5 is a block diagram of another modification of the MV restructuring unit shown in FIG. 1.

Shown in FIG. 5 is a block diagram of another modification of the MV restructuring unit 6 shown in FIG. 1 used for the case where bit streams input to and output from the apparatus shown in FIG. 1 are of the same pixel block size but different in accuracy of motion compensation.

The operation of the MV restructuring unit 6 (FIG. 5) will be disclosed with reference to FIG. 1.

The variable-length decoder 2 outputs the first MV data to the MV restructuring unit 6 and the first MV data is stored in an MV buffer 26. Motion vectors of the first MV data are then supplied to an MV detector 27 as reference motion vectors. Also supplied to the detector 27 is the reproduced moving picture from the adder 5. The detector 27 detects the motion of the reproduced moving picture by block matching using the reference motion vectors and other motion vectors adjacent to the reference motion vectors. The detector 27 detects the motion vectors, the smallest of which is the total of the difference in pixel luminance values between the reproduced moving picture and the other moving picture to which the reproduced moving picture has been displaced by the reference motion vectors. The detected motion vectors are then output as the second MV data.

Figure 6A:
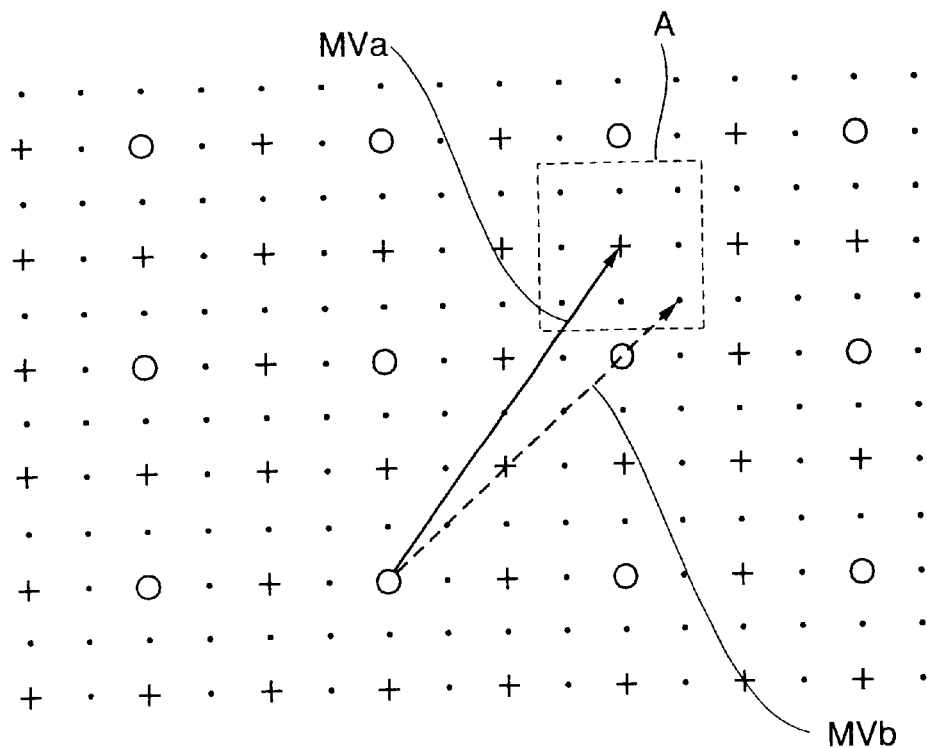
FIGS. 6A and 6B illustrate the processing executed by the MV restructuring unit shown in FIG. 5.
Figure 6B:
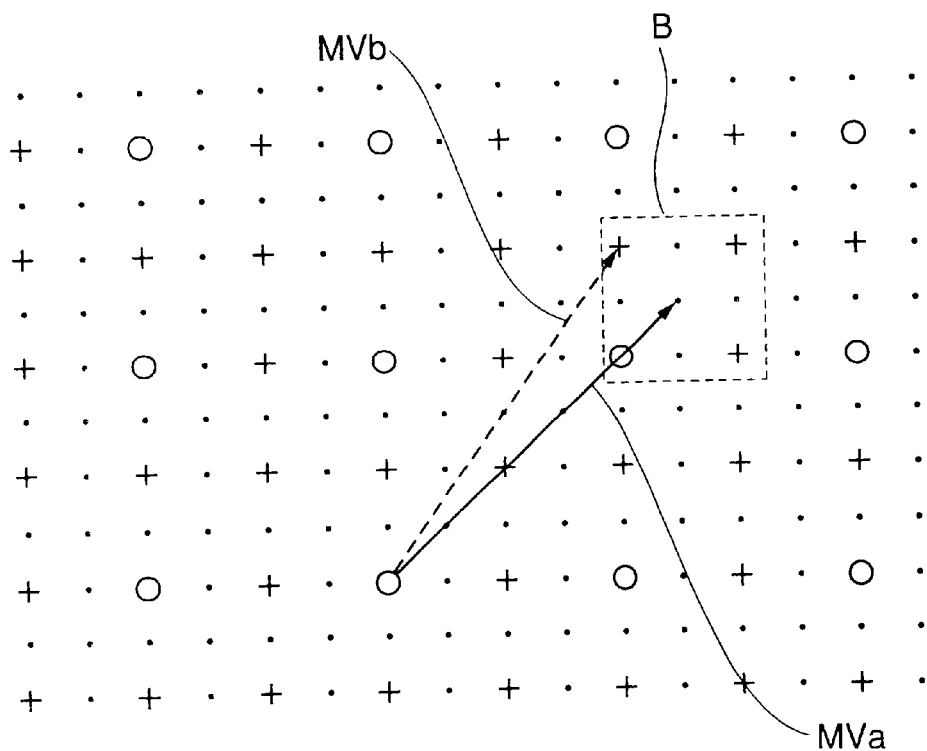

Illustrated in FIGS. 6A and 6B are the processing executed by the MV restructuring unit 6 (FIG. 5). FIG. 6A shows MV data restructuring from ½ to ¼ pixel for accuracy of motion compensation. On the other hand, FIG. 6B shows MV data restructuring from ¼ to ½ pixel for accuracy of motion compensation. In each drawing, the signs "○", "+" and "●" represent the location of motion vectors at 1, ½ and ¼ pixel accuracy, respectively.

FIG. 6A shows that the motion of the reproduced moving picture is detected in the area A by block matching using the reference motion vector MVa of the first MV data and other motion vectors adjacent to the motion vector MVa for MV data restructuring from ½ to ¼ pixel for motion compensation accuracy. The motion vector MVb is detected for the second MV data, the smallest of which is the total of the difference in pixel luminance values between the picture to be coded (reproduced moving picture) and the reference picture to which the reproduced moving picture has been displaced by the reference motion vector MVa.

FIG. 6B shows that the motion of the reproduced moving picture is detected in the area B by block matching using the reference motion vector MVa of the first MV data and other motion vectors adjacent to the motion vector MVa for MV data restructuring from ¼ to ½ pixel for motion compensation accuracy. The motion vector MVb is detected for the second MV data, the smallest of which is the total of the difference in pixel luminance values between the reproduced moving picture and the other moving picture to which the reproduced moving picture has been displaced by the reference motion vector MVa.

The area A or B is in the range of ±¼ pixels in the horizontal and vertical directions when accuracy for the first and the second MV data are ½ and ¼, respectively. It is in the range of ±½ pixels in the horizontal and vertical directions when accuracy for the first and the second MV data are 1 and ½ pixel, respectively. Moreover, it is in the range of ±½ to ±¾ pixels in the horizontal and vertical directions when accuracy for the first and the second MV data are 1 and ¼ pixel, respectively. Accuracy of determining the second MV data depends on the accuracy of the motion compensation using the second MV data.

Figure 7:
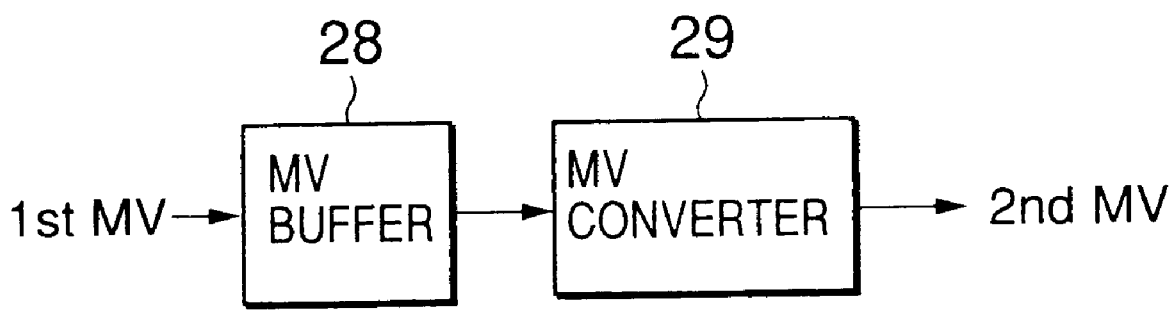
FIG. 7 is a block diagram of still another modification of the MV restructuring unit shown in FIG. 1.

Shown in FIG. 7 is a block diagram of still another modification of the MV restructuring unit 6 shown in FIG. 1 used for the case where bit streams input to and output from the apparatus shown in FIG. 1 are of the same pixel block size but the output bit stream has lower accuracy of motion compensation after MV data restructuring like shown in FIG. 6B is executed.

The operation of the MV restructuring unit 6 (FIG. 7) will be disclosed with reference to FIG. 1.

The variable-length decoder 2 stores the first MV data in an MV buffer 28. Motion vectors of the first MV data are then supplied to an MV converter 29 and converted into motion vectors of the second MV data having predetermined values. The vector conversion is done by rounding down the absolute value of each motion vector of the first MV data to the smaller value. For example, the motion vector value "±3.75" of the first MV data is rounded down to the value "±3.5" for the second MV data; and "−1.25" to "−1.0".

This rounding processing results in a small amount of processed data compared to the processing explained with reference to FIG. 5.

The MV data restructuring is switched between the processing explained with reference to FIGS. 5 and 7 according to the motion compensation accuracy when the encoding processing for either the bit stream input to or output from the apparatus shown in FIG. 1 has a combination of high and low accuracy. The same compensation accuracy between the input and output bit streams requires the first MV data as the second MV data as it is with no restructuring.

As described above, according to the present invention, a portion or all of the first input bit stream is decoded by motion-compensated prediction at the first block size using the first motion vector data. Furthermore, the second motion vector data is detected by using the first motion vector data. The second motion vector data corresponds to the second block size that is different from the first block size. The decoded first bit stream is then encoded (re-encoded) by motion-compensated prediction at the second block size using the second motion vector data to obtain a third bit stream.

The present invention therefore achieves conversion of a bit stream to another bit stream with different block sizes for motion-compensated prediction. This invention further detects the motion vector data for the latter bit stream by using the motion vector data for the former bit stream. This vector detection requires less processing than that for detecting the motion vector data for the latter bit stream without respect to the motion vector data for the former bit stream. Furthermore, the entire circuitry according to this invention can be made compact than that for complete decoding and reencoding for the latter bit stream.

Furthermore, according to the present invention, a portion or all of the first input bit stream is decoded by motion-compensated prediction at the first accuracy of motion compensation. The second motion vector data is detected by motion-compensated prediction using the first motion vector data for the first bit stream. The second motion vector data corresponds to the second accuracy of motion compensation that is different from the first accuracy of motion compensation. Then, the decoded first bit stream is encoded (re-encoded) by motion-compensated prediction at the second accuracy of motion compensation using the second motion vector data to obtain a third bit stream.

The present invention therefore achieves conversion of a bit stream to another bit stream with different levels of motion compensation accuracy. This invention further detects the motion vector data for the latter bit stream by using the motion vector data for the former bit stream. This vector detection requires less processing than that for detecting the motion vector data for the latter bit stream without respect to the motion vector data for the former bit stream.

Furthermore, the entire circuitry according to this invention can be made compact than that for complete decoding and re-encoding for the latter bit stream.

Moreover, detection of the second motion vector data in re-encoding of the decoded bit stream of picture would detect the motion that is different from the original picture due to low quality of the decoded picture. On the contrary, the present invention detects the second motion vector data using the first motion vector data for the first bit stream. This achieves detection of the motion that is close to the original picture. The second motion vector data is also close to the first motion vector data because the former data is detected by using the latter data. This results in the minimum variation in predictive error in re-encoding to reproduce pictures of high quality.

What is claimed is:

1. An apparatus for converting a first bit stream of moving picture that has been encoded by motion-compensated prediction to a second bit stream of moving picture motion-compensated at a block size different from that for the first bit stream, the apparatus comprising:

a separator to separate a bit stream of first motion vector data from the first bit stream, the first motion vector data corresponding to a first block size;

a decoder to decode a portion or all of the first bit stream by motion-compensated prediction at the first block size using the first motion vector data to obtain a decoded picture or a decoded signal at an intermediate processing stage;

a forming unit to form a bit stream of second motion vector data using the first motion vector data by forming a plurality of second motion vectors for the second motion vector data by using one first motion vector for the first motion vector data, the second motion vector data corresponding to a second block size that is smaller than the first block size;

an encoder to encode the decoded picture or the decoded signal by motion-compensated prediction at the second block size using the second motion vector data to obtain a third bit stream; and a multiplexer to multiplex the third bit stream and the bit stream of the second motion vector data to obtain the second bit stream.

2. A method of converting a first bit stream of moving picture that has been encoded by motion-compensated prediction to a second bit stream of moving picture motion-compensated at a block size different from that for the first bit stream, the method comprising the steps of:

separating a bit stream of first motion vector data from the first bit stream, the first motion vector data corresponding to a first block size;

decoding a portion or all of the first bit stream by motion-compensated compensated prediction at the first block size using the first motion vector data to obtain a decoded picture or a decoded signal at an intermediate processing stage;

forming a bit stream of second motion vector data using the first motion vector data by forming a plurality of second motion vectors for the second motion vector data by using one first motion vector for the first motion vector data, the second motion vector data corresponding to a second block size that is smaller than the first block size;

encoding the decoded picture or the decoded signal by motion-compensated prediction at the second block size using the second motion vector data to obtain a third bit stream; and multiplexing the third bit stream and the bit stream of the second motion vector data to obtain the second bit stream.

3. An apparatus for converting a first bit stream of moving picture that has been encoded by motion-compensated prediction to a second bit stream of moving picture motion-compensated at accuracy different from that for the first bit stream, the apparatus comprising:

a separator to separate a bit stream of first motion vector data from the first bit stream, the first motion vector corresponding to first accuracy of motion compensation;

a decoder to decode a portion or all of the first bit stream by motion-compensated prediction at the first accuracy of motion compensation using the first motion vector data to obtain a decoded picture or a decoded signal at an intermediate processing stage;

a forming unit to form a bit stream of second motion vector data by motion-compensated prediction using the first motion vector data, the second motion vector data corresponding to second accuracy of motion compensation that is different from the first accuracy of motion compensation;

an encoder to encode the decoded picture or the decoded signal by motion-compensated prediction at the second accuracy of motion compensation using the second motion vector data to obtain a third bit stream; and a multiplexer to multiplex the third stream and the bit stream of the second motion vector data to obtain the second bit stream.

4. The apparatus according to claim 3, the vector forming unit detecting motion vectors for the second motion vector data on the decoded picture at the second accuracy of motion compensation by using the first vector data.

5. A method of converting a first bit stream of moving picture that has been encoded by motion-compensated prediction to a second bit stream of moving picture motion-compensated at accuracy different from that for the first bit stream, the method comprising the steps of:

separating a bit stream of first motion vector data from the first bit stream, the first motion vector corresponding to first accuracy of motion compensation;

decoding a portion or all of the first bit stream by motion-compensated prediction at the first accuracy of motion compensation using the first motion vector data to obtain a decoded picture or a decoded signal at an intermediate processing stage;

forming a bit stream of second motion vector data by motion-compensated prediction using the first motion vector data, the second motion vector data corresponding to second accuracy of motion compensation that is different from the first accuracy of motion compensation;

encoding the decoded picture or the decoded signal by motion-compensated prediction at the second accuracy of motion compensation using the second motion vector data to obtain a third bit stream; and multiplexing the third bit stream and the bit stream of the second motion vector data to obtain the second bit stream.

6. The method according to claim 5, the forming step including the step of detecting motion vectors for the second motion vector data on the decoded picture at the second accuracy of motion compensation by using the first vector data.

7. An apparatus for converting a first bit stream of a moving picture that has been encoded by motion-compensated prediction to a second bit stream of moving picture motion-compensated at a block size different from that for the first bit stream, the apparatus comprising:

a separator to separate a bit stream of first motion vector data from the first bit stream, the first motion vector data corresponding to a first block size;

a decoder to decode a portion or all of the first bit stream by motion-compensated prediction at the first block size using the first motion vector data to obtain a decoded picture or a decoded signal at an intermediate processing stage;

a forming unit to form a bit stream of second motion vector data using the first motion vector data by forming one second motion vector for the second motion vector data by using a plurality of first motion vectors for the first motion vector data, the second motion vector data corresponding to a second block size that is larger than the first block size;

an encoder to encode the decoded picture or the decoded signal by motion-compensated prediction at the second block size using the second motion vector data to obtain a third bit stream; and a multiplexer to multiplex the third bit stream and the bit stream of the second motion vector data to obtain the second bit stream.

8. A method of converting a first bit stream of a moving picture that has been encoded by motion-compensated prediction to a second bit stream of moving picture motion-compensated at a block size different from that for the first bit stream, the method comprising the steps of:

separating a bit stream of first motion vector data from the first bit stream, the first motion vector data corresponding to a first block size;

decoding a portion or all of the first bit stream by motion-compensated prediction at the first block size using the first motion vector data to obtain a decoded picture or a decoded signal at an intermediate processing stage;

forming a bit stream of second motion vector data using the first motion vector data by forming one second motion vector for the second motion vector data by using a plurality of first motion vectors for the first motion vector data, the second motion vector data corresponding to a second block size that is larger than the first block size;

encoding the decoded picture of the decoded signal by motion-compensated prediction at the second block size using the second motion vector data to obtain a third bit stream; and multiplexing the third bit stream and the bit stream of the second motion vector data to obtain the second bit stream.

\* \* \* \* \*